United States Patent
Roszman et al.

(10) Patent No.: US 6,397,983 B1
(45) Date of Patent: Jun. 4, 2002

(54) AUTOMATIC ADJUSTMENT FOR DISC BRAKE PAD

(75) Inventors: Eric John Roszman, Owosso; Chris William Henley, Novi; Sean Christopher Barrett, Dearborn Heights, all of MI (US)

(73) Assignee: Akebono Corporation North America, Farmington Hills, MI (US)

( * ) Notice: Subject to any disclaimer, the term of this patent is extended or adjusted under 35 U.S.C. 154(b) by 0 days.

(21) Appl. No.: 09/790,564

(22) Filed: Feb. 23, 2001

(51) Int. Cl.[7] ............................................... F16D 65/14
(52) U.S. Cl. ................................. 188/73.44; 188/71.8
(58) Field of Search ...................... 188/73.44, 73.45, 188/73.43, 71.8

(56) References Cited

U.S. PATENT DOCUMENTS

| | | | |
|---|---|---|---|
| 4,027,750 A | * | 6/1977 | Kawamoto et al. ...... 188/73.44 |
| 4,334,598 A | | 6/1982 | Portolese |
| 4,436,186 A | * | 3/1984 | Ritsema et al. .......... 188/73.44 |
| 4,448,288 A | * | 5/1984 | Delauany ................. 188/73.45 |
| 4,471,858 A | * | 9/1984 | Kawase .................... 188/73.44 |
| 4,537,288 A | | 8/1985 | Stoka |
| 4,715,479 A | | 12/1987 | Buckley |
| 4,807,725 A | | 2/1989 | Weiler et al. |
| 4,865,161 A | | 9/1989 | Schneider et al. |
| 4,887,696 A | | 12/1989 | Redenbarger et al. |
| 5,785,156 A | * | 7/1998 | Warwick et al. ......... 188/73.44 |
| 5,931,267 A | * | 8/1999 | Iwata et al. .............. 188/73.45 |
| 5,934,416 A | | 8/1999 | Maeda |
| 6,158,557 A | * | 12/2000 | Leitermann et al. ....... 188/71.8 |
| 6,161,658 A | * | 12/2000 | Becocci ................... 188/73.45 |

* cited by examiner

Primary Examiner—Paul N. Dickson
Assistant Examiner—Devon Kramer
(74) Attorney, Agent, or Firm—Clark & Brody

(57) ABSTRACT

A mechanism for a sliding-pin type disc brake assembly provides a gap between a brake pad and the rotor. The mechanism includes a bushing that receives a sliding pin and a resilient element between the end of the pin and the end of the bushing. The pin reciprocates in the bushing during operation of the brakes, and the bushing moves along the bore as the brake pads wear.

18 Claims, 1 Drawing Sheet

AUTOMATIC ADJUSTMENT FOR DISC BRAKE PAD

TECHNICAL FIELD

1. This invention relates primarily to the art of disc brakes. In particular, the invention relates to a mechanism for providing a clearance between a brake pad and a rotor in a sliding-pin, floating-caliper disc brake.

BACKGROUND

2. A common problem in the art of brakes is that stationary brake pads often drag on a movable friction element after the braking pressure has been released. This causes excessive wear on the pads and reduces the overall performance of the vehicle. In the art of automotive and truck disc brakes, this problem is presented when the brake pad that is carried by a movable, or floating, caliper drags on the rotor after braking pressure is released. This occurs mostly because the frictional forces between the elements carrying the caliper, such as the friction between the slide pins and the walls of the bore in which they ride, prevent return of the caliper to a rest position providing a gap between the pad and the rotor after release of braking pressure.

3. The pad controlled directly by the movable piston does often not present unwanted drag on the rotor because return force applied by the resilience of the piston seal is large enough to return the piston to a rest position providing an adequate gap for the pad.

4. A complicating factor in the design of mechanisms that urge the caliper toward a rest position is that the rest position continuously changes as the brake pads wear during use. For this reason and others, mechanisms that have been proposed for moving the caliper toward a rest position after release of braking pressure have generally been complicated and, consequently, hard to install and expensive.

SUMMARY OF THE INVENTION

5. The support bracket, or carrier, of a sliding-pin disc brake assembly is typically provided with one or more bores, each of which receives a sliding pin that can be either a guide pin or a lock pin. (The invention will be described further below with reference to a sliding pin generally, which can be either a lock pin or a guide pin.) The sliding pin can be either a one or two-piece pin that is secured to a movable (floating) caliper at one end and received in a bore in the support bracket at the other end. The pin reciprocates in the bore to guide movement of the caliper toward and away from the rotor as braking pressure is applied by a piston carried in a hydraulic chamber, as known in the art.

6. In accordance with the invention, the bore that receives the sliding pin is provided with a bushing that has an interference fit in the bore. The free end of the sliding pin is of reduced diameter to provide a shoulder, the reduced diameter portion extending through the end wall of the bushing. A resilient element is placed between a retainer on the reduced diameter portion and the end wall of the bushing so that movement of the caliper and sliding pin resulting from the application of brakes applies a force to the resilient element. When the braking force is released, the resilient element restores to its original condition and thereby moves the sliding pin and caliper to a rest position. This rest position provides the desired gap between the brake pad and the rotor.

7. In the preferred embodiment, the resilient element is a wave washer, which is placed between the end of the bushing and the end of the lock pin. It may, however, be any of several resilient elements such as an O-ring or another type of spring. As well, the structure may be arranged so that the restoring element acts either in tension or compression.

8. The bushing is engaged in the opening such that it does not move in response to the relatively smaller forces provided by the resilient element, but does move in response to the larger forces provided by the hydraulic cylinder during braking when the resilient element is fully compressed. That is, the resilient element is designed to have a working distance that accommodates the distance through which the caliper reciprocates during normal braking. This distance is typically the thickness of the desired gap between the brake pad and the rotor when no braking pressure is applied plus the compression of the pads and deflection of the caliper body under a specific brake fluid pressure. When the caliper moves beyond the normal reciprocation distance, which occurs during braking after finite pad wear, the caliper will carry the bushing along with it. Thus, the bushing will assume a new position further along in the opening to accommodate wear of the brake pads.

9. The desired relationship between the force required to compress the resilient element and the force required to move the bushing can be attained in any of several ways. For example, a desired resisting force between the outer wall of the bushing and the inner wall of the opening can be attained by selecting the diameter of the bushing and the diameter of the opening to provide an interference fit that provides enough friction to resist movement during normal reciprocation of the caliper while allowing movement after pad wear. Other techniques may be used, such as by use of a coating or particular materials for the exterior of the bushing that provide the desired level of friction.

10. In the preferred embodiment, the force required to move the bushing is about ten times that required to move the sliding pin and caliper.

11. The bushing and slide pin are preferably cylindrical to fit in a cylindrical opening, but it will be appreciated that these elements may have other cross sections as well.

DETAILED DESCRIPTION OF THE PREFERRED EMBODIMENT

Figure 1:
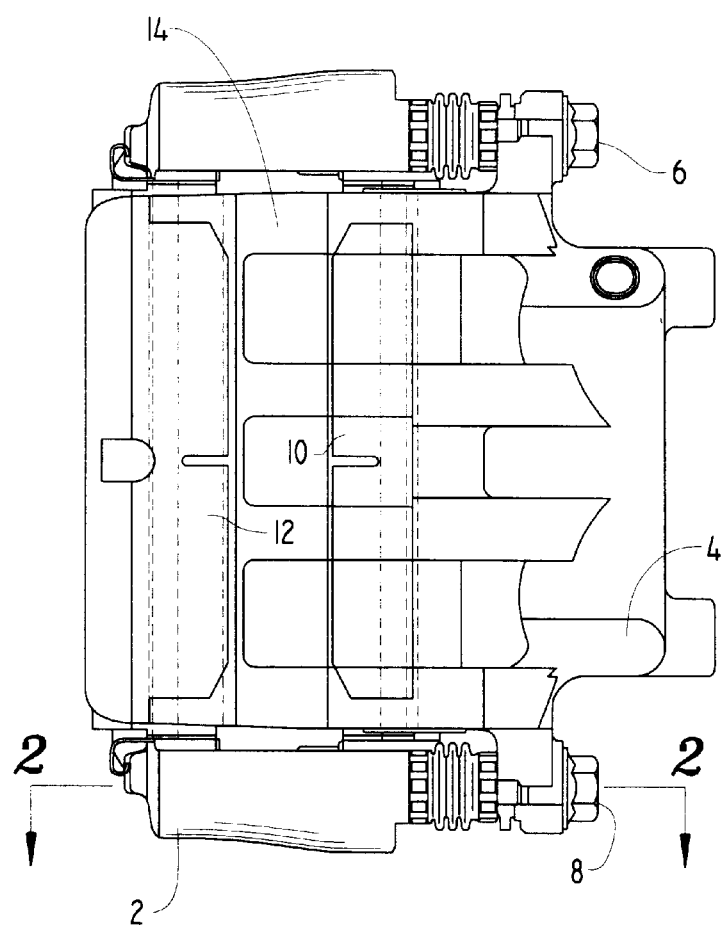
FIG. 1 is a top view of a disc brake having an adjustment mechanism in accordance with the invention.

14. Referring to FIG. 1, a brake assembly includes a support bracket 2 and a movable caliper 4. The caliper is mounted on the support bracket for movement with respect to the bracket during braking operation by a sliding guide pin 6 and a sliding lock pin 8. The slide pins each preferably comprise two parts (and are shown in the attached diagram), but could be designed to consist of only one part. Two-piece slide pins are configured such that one part is slidingly received in a bore in the support bracket, and another part secures the first part to the movable caliper. The second part may, for example, be a threaded bolt that engages a threaded hole in the first part. A one-piece slide pin has the ability to slide in the pin bore, and has an attachment feature incorporated into the design that allows the pin to be affixed to the moveable caliper. The caliper carries a first brake pad 10 that moves in response to movement of a piston in a hydraulic chamber inside the caliper and a second brake pad 12, which faces the first brake pad. The caliper is mounted on the bracket so that the two pads are arranged on opposite sides of a rotor 14 and are forced toward each other during braking by application of hydraulic pressure to the piston in the hydraulic chamber.

Figure 2:
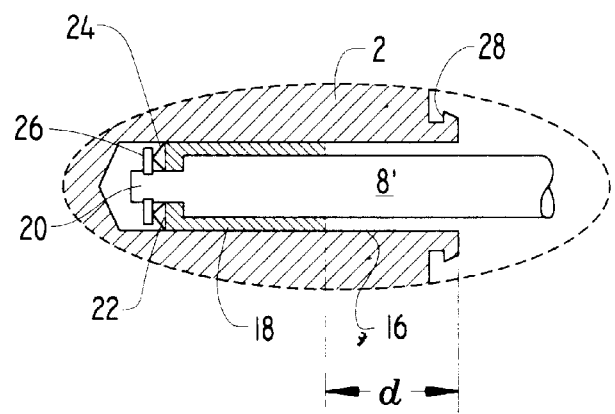
FIG. 2 is a cross section taken along line 2—2 of FIG. 1.

15. FIG. 2 is a cross section taken along line 2—2 of FIG. 1 and illustrates a preferred embodiment of a mechanism in accordance with the invention for maintaining a gap between the pad 12 and the rotor 14. The support bracket 2 is provided with a bore 16 for receiving the first part 8' of the sliding lock pin 8. The bore guides the movement of the pin and, hence, guides the movement of the caliper during operation of the brake assembly. A bushing 18 has an interference fit into the bore 16, and during normal braking operation the pin 8 reciprocates in the bushing 18, which remains stationary in the bore due to friction between the outer wall of the bushing and the inner wall of the bore. A reduced diameter end part 20 of the pin 8' extends through a hole in the end wall 22 of the bushing (This feature could also be incorporated into the retainer, and be fastened to the pin 8'). A wave washer 24 is held between the outer end of the bushing and a retainer 26 secured to the end of the guide pin. A lip 28 is provided for attaching a boot (not shown) to prevent entry of debris into the pin bore.

16. During normal braking operation, the wave washer 24 is compressed as the caliper 4 and sliding lock pin 8 move with respect to the bushing in a direction to the right of FIG. 2, the movement of the caliper being guided by the bushing and lock pin. When braking pressure is released, the wave washer will restore to its original condition and exert a force urging the retainer away from the end of the bushing. This restoring force will pull the caliper back toward its original position to provide the desired gap between the outboard brake pad 12 and the rotor 14. Preferably, the wave washer operates to move the caliper about one-half the rollback distance of the brake cylinder piston.

17. Because operation of the brake assembly causes wear of the brake pads 10 and 12, the rest position of the caliper must change continuously over time. As the thickness of the brake pads decreases, the rest position of the caliper must change to maintain a given gap between the pads and the rotor, which provides a clearance to prevent drag and also maintains the distance the brake pedal moves before the brake pads contact the rotor. Thus, as the brake pads wear, a normal braking operation will move the pin 8 by a distance equal to the rotor clearance plus the amount of pad wear, pad compression, and caliper body deflection. Because this distance is larger than the rotor clearance, pad compression, and caliper body deflection (as designed) the wave washer will collapse completely, causing the force applied to the caliper to be applied to the end of the bushing 18. The bushing 18, accordingly, will move toward the right of FIG. 2 by the amount of the pad wear. When braking pressure is released, the wave washer will restore and pull the caliper to a position that again provides the desired rotor clearance.

18. It will be appreciated that the bushing will periodically move along the bore 16 toward the right of FIG. 2 as the brake pads wear. Thus, the distance "d" in FIG. 2 must at least equal the thickness of outboard pad 12 to allow the bushing to be displaced by that distance without protruding from the opening when the pads are worn to avoid interference with other operations of the assembly.

19. Assembly of the mechanism of the invention described is quite easy for two-piece sliding pins. The sliding part 8' of lock pin 8 and the bushing are assembled by attaching the resilient element and retainer. The bushing, resilient element, and retainer are then inserted into the bore 16 and pressed to a depth that will accommodate the thickness of the brake pads. It will be appreciated that this is possible because the maximum cross-sectional dimensions of the resilient element, the retainer, and the pin are less than the maximum cross-sectional dimension of the bushing. The caliper is then secured to the pin by the threaded bolt. One-piece pins will either have to have the mechanism installed after the pin is affixed to the moveable caliper, or the female feature of the moveable caliper that mates with the fastening feature of the one-piece pin must be large enough to allow the pin with the mechanism installed on it to pass completely through it.

20. It will be appreciated that the structure described above is also easily manufactured. For example, existing pins may be machined in a simple operation to provide the end portion with a reduced diameter and shoulder to cooperate with the end wall of the bushing.

21. Modifications within the scope of the appended claims will be apparent to those of skill in the art.

We claim:

1. A disc brake comprising:
    a stationary support bracket having a bore therein, said bore having an open end and a closed end,
    a caliper movable with respect to support bracket,
    a pin fixed to said caliper for movement with said caliper with respect to said support bracket,
    a bushing movably received in said bore in said support bracket and slidably receiving said pin through said open end in said bore, and
    a resilient element mounted between said pin and said bushing to apply a force on said pin urging said caliper in a first direction with respect to said support bracket.

2. A disc brake according to claim 1 wherein said force moves said caliper to provide a predetermined clearance between a brake pad attached to said caliper and a disc rotor.

3. A disc brake according to claim 2 wherein said bushing is mounted to move with said pin as said brake pad reduces in thickness.

4. A disc brake according to claim 1 wherein said bushing and pin are cylindrical, a first end of said pin extends beyond a first end of said bushing, and said resilient element is located between said first end of said pin and said first end of said bushing.

5. A disc brake according to claim 4 further comprising a retainer attached to said first end of said pin and wherein said resilient element is a wave washer located between said retainer and said first end of said bushing.

6. Apparatus providing a clearance gap between a brake pad and a rotor in a disc brake, comprising a bushing adapted to be movably received in a bore in a support bracket of said disc brake, a pin slidingly received in said bushing, a resilient element received between said pin and said bushing to apply a force urging said pin in a first direction with respect to said bushing, a stop element on said pin configured to engage a portion of said bushing to limit the extent of movement of said pin with respect to said bushing in said first direction, and wherein the maximum cross-sectional dimensions of said pin, resilient element and stop element are less than the maximum cross sectional dimension of said bushing.

7. Apparatus according to claim 6 wherein said resilient element is located between a first end of said pin and a first end of said bushing.

8. Apparatus according to claim 7 wherein said first end of said pin extends beyond said bushing.

9. Apparatus according to claim 8 further comprising a retainer attached to said first end of said pin and engaging said resilient element.

10. Apparatus according to claim 9 wherein said resilient element is a wave washer.

11. A disc brake comprising:

a support bracket, a caliper, a pin fixed to said caliper, a bushing movably received in said support bracket and slidably receiving said pin, a resilient element mounted between said pin and said bushing to apply a force on said pin urging said caliper in a first direction with respect to said support bracket, and wherein said bushing and pin are cylindrical, a first end of said pin extends beyond a first end of said bushing, and said resilient element is located between said first end of said pin and said first end of said bushing, and further comprising a retainer attached to said first end of said pin and wherein said resilient element is a wave washer located between said retainer and said first end of said bushing.

12. Apparatus providing a clearance gap between a brake pad and a rotor in a disc brake, comprising a bushing adapted to be movably received in bore in a support bracket of said disc brake, a pin received in said bushing, and a resilient element received between said pin and said bushing to apply a force urging said pin in a first direction with respect to said bushing, wherein said resilient element is located between a first end of said pin and a first end of said bushing, and said first end of said pin extends beyond said bushing, and further comprising a retainer attached to said first end of said pin and engaging said resilient element.

13. Apparatus according to claim 12 wherein said resilient element is a wave washer.

14. Apparatus adapted to provide a clearance gap between a brake pad and a rotor in a disc brake comprising a tubular bushing having an exterior surface and an internal, axially extending opening, a slide pin with one end slidingly carried in said opening, a resilient element received between said slide pin and said tubular bushing and arranged to urge said slide pin in a first axial direction with respect to said bushing, and a stop element that engages a portion of said bushing when said pin is in a predetermined location with respect to said bushing to preclude further movement of said slide pin in said first axial direction, wherein the maximum cross-sectional dimensions of said slide pin, resilient element and stop element are less that the maximum cross-sectional dimension of said bushing.

15. Apparatus according to claim 14 wherein a portion of said one end of said slide pin extends beyond an adjacent end of said bushing and said stop element is secured to said portion.

16. Apparatus according to claim 15 wherein said adjacent end of said bushing comprises an end wall with a central hole therein and said portion passes through said central hole.

17. Apparatus according to claim 16 wherein the diameter of said portion is less than the diameter of said slide pin and said resilient element is held between said stop element and said end wall.

18. Apparatus according to claim 17 wherein said resilient is a wave washer.

\* \* \* \* \*